United States Patent [19]

Hall et al.

[11] 3,900,598

[45] Aug. 19, 1975

[54] OHMIC CONTACTS AND METHOD OF PRODUCING SAME

[75] Inventors: Edward L. Hall; Elliott M. Philofsky, both of Phoenix, Ariz.

[73] Assignee: Motorola, Inc., Chicago, Ill.

[22] Filed: July 9, 1973

[21] Appl. No.: 377,673

Related U.S. Application Data

[62] Division of Ser. No. 234,252, March 13, 1972, abandoned.

[52] U.S. Cl. .................... 427/90; 317/234; 427/91

[51] Int. Cl. .................... C23e 1/08

[58] Field of Search .......... 117/227, 217; 317/234 L

[56] References Cited

UNITED STATES PATENTS

| | | | |
|---|---|---|---|
| 3,353,073 | 11/1967 | Majemo et al. | 317/234 |
| 3,607,479 | 9/1971 | Murrmann | 117/227 |
| 3,620,837 | 11/1971 | Leff | 117/217 |
| 3,754,901 | 8/1973 | Hall et al. | 117/227 |
| 3,794,516 | 2/1974 | Engeler et al. | 117/217 |

*Primary Examiner*—William E. Schulz
*Attorney, Agent, or Firm*—Vincent J. Rauner; Ellen P. Trevors; Henry T. Olsen

[57] ABSTRACT

A technique for reducing the solubility of a semiconductor material into an aluminum layer making ohmic contact thereto. A small percentage of another metal, such as, iron, magnesium, chromium, manganese, nickel, cobalt and titanium is codeposited with the aluminum metallization to prevent excessive dissolution of the semiconductor material into the metallization during heating of the device.

5 Claims, 2 Drawing Figures

OHMIC CONTACTS AND METHOD OF PRODUCING SAME

This is a division of application Ser. No. 234,252 filed Mar. 13, 1972, now abandoned.

BACKGROUND

This invention relates generally to methods and means for making ohmic contacts to semiconductor devices, and more particularly to the evaporative co-deposition of aluminum and another metal which reduces the solubility of silicon semiconductor material into the aluminum metallization.

In the fabrication of silicon semiconductor devices, aluminum is generally used to make an ohmic contact to the device. Under high temperature conditions on the order of 500°C, which can occur during the alloying process which forms the ohmic contact, and during passivation and other subsequent device processing steps, a sufficient amount of silicon can dissolve into the aluminum contact to cause the device to short out or to excessively raise the resistance of the contact.

Several techniques for reducing the solubility of silicon into aluminum are known. In one such system, a small percentage of silicon is co-deposited with the aluminum metallization to coact with the aluminum and reduce the dissolution of silicon from the semiconductor device into the resultant alloy. In another technique, a barrier layer of another metal such as chromium is deposited between the silicon device and the aluminum metallization. Whereas these techniques provide a way to reduce the dissolution of silicon from the semiconductor device into the aluminum metallization, the first technique results in a residue of silicon particles being left behind as possible contaminants when the metallization is etched, and the second technique requires an additional process step to deposit the barrier layer.

SUMMARY

It is an object of the present invention to provide a method for obtaining an improved ohmic contact to a semiconductor device.

It is another object of this invention to provide a semiconductor device wherein the semiconductor material of the device does not substantially dissolve into the metal making ohmic contact with the device when the device is heated.

Yet another object of this invention is to provide a more reliable semiconductor device.

It is a further object of this invention to provide an ohmic contact to a semiconductor device that is more resistant to electromigration.

Still another object of this invention is to provide an ohmic contact having reduced silicon solubility and improved etching properties.

In accordance with a preferred embodiment of the invention, aluminum contact metallization is co-deposited with a small percentage of another metal such as iron, magnesium or other suitable metal enumerated later in this disclosure. The deposition may be achieved by a vapor deposition process wherein the aluminum and the alloying metal are simultaneously evaporated onto the semiconductor substrate from separate sources or from an aluminum-metal alloy. Heat is applied to the substrate to alloy the metal layer into the silicon to form an ohmic contact therebetween. The solubility of silicon in the metal layer is sufficient to provide a good ohmic contact, but insufficient to cause excessive dissolution of the silicon into the metal during the alloying process or during subsequent heating of the device.

DETAILED DESCRIPTION

Figure 1:
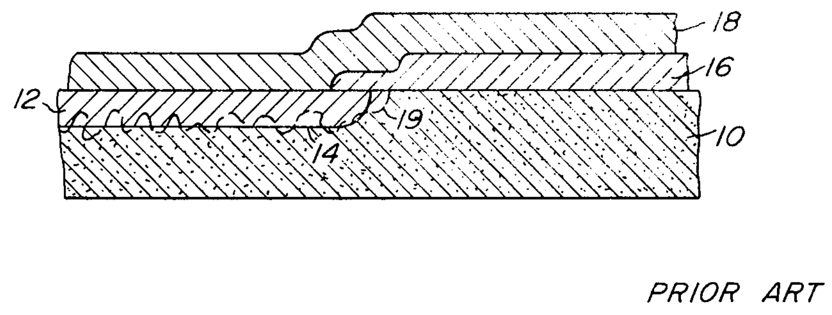
FIG. 1 is a cross sectional view of a semiconductor device of a prior art showing the effects of dissolution of silicon into a pure aluminum ohmic contact.

Referring to Fig. 1, there is shown a cross section of a portion of a semiconductor device having an ohmic contact made thereto according to prior art. A semiconductor substrate 10 has an area of impurities 12 diffused therein. The diffused area 12 and the substrate 10 form a junction at a line 14. Although a single area of impurities which is diffused directly into the substrate to form a single junction is shown, the diffusion can be made into other areas such as, for example, epitaxial layers or into other diffusions to form a multiplicity of junctions. An insulating layer of a material, such as, for example, silicon dioxide or silicon nitride is deposited according to techniques well known in the art over a predetermined portion of the substrate, leaving exposed the portion of the diffused area to which contact is to be made.

A layer of pure aluminum 18 is deposited over the entire substrate including the exposed contact area. The deposition is achieved through the use of standard vapor deposition techniques in which pure aluminum is heated to a temperature on the order of 1,000° to 1,200°C which is sufficient to cause evaporation of the aluminum. The substrate is placed in the evacuated evaporation chamber and the evaporating aluminum is deposited on the substrate. Subsequent to deposition, the aluminum is masked and etched to a desired predetermined pattern and alloyed into the contact area to form an ohmic contact. Subsequent steps such as, for example, the application of a silicon dioxide or silicon nitride passivation layer may be done following the deposition and etching of the aluminum.

In order to make a proper ohmic contact between the diffused area 12 and the aluminum contact 18, some of the silicon from the semiconductor device must be alloyed into the aluminum contact. This is done by an alloying step wherein the device is heated to a temperature on the order of 500°C to allow silicon from an area below the aluminum contact to dissolve into the contact. The boundary of this area is shown by the dotted line 19. The depth of this area is determined by the solubility of silicon into aluminum. The electrical properties of the silicon within boundary 19 are changed by the removal of silicon therefrom into the aluminum, and by the doping of the silicon by the aluminum.

It is possible for the depth of the alloying region, as shown by line 19, to extend below the diffused area 12. This is particularly true in shallow diffusion devices such as, for example, high frequency radio frequency transistors which have an emitter diffusion of less than 1 micron deep. When the alloying area extends through the junction 14, the junction is shorted out or otherwise made inoperative.

Steps may be taken to limit the depth of the alloyed area through careful time and temperature control of the alloying process. However, these controls are critical, and even if a successful contact is made during the alloying process, a subsequent processing step such as, for example, passivation, which requires the device to be heated to about 500°C, can cause further alloying which may be sufficient to destroy the junction. The reliability of a device employing a pure aluminum ohmic contact is impaired because any further heating of the device, including high power operation, can cause sufficient alloying to destroy the device.

Another problem that occurs with pure aluminum ohmic contacts is electromigration. Electromigration occurs when the device is operated with a high current density flowing through the contact and when the device is operated at a relatively high ambient temperature, such as, for example, 125°C. Under these conditions, aluminum atoms migrate, and silicon atoms, which are knocked from the lattice by the electrons flowing therethrough, migrate into the aluminum metallization. This effect changes the electrical characteristics of the silicon device and raises the resistance of the aluminum contact, thereby degrading the performance of the device and causing premature failure resulting from the increased contact resistance and possible shorting out of the junction.

Figure 2:
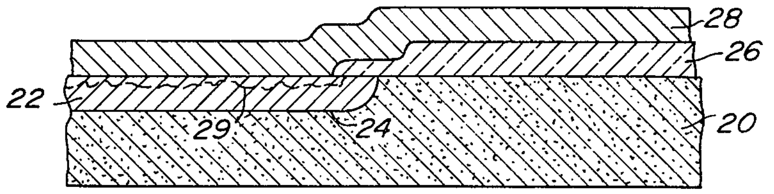
FIG. 2 is a cross sectional view of a similar device employing an aluminum alloy metallization for making an ohmic contact according to the invention.

Through extensive experimentation, it has been discovered that the aforementioned problems caused by dissolution and electromigration can be significantly reduced by utilizing an aluminum alloy instead of pure aluminum metallization to form the ohmic contact. Referring to Fig. 2, there is shown a portion of a semiconductor device utilizing an aluminum alloy metallization according to the invention. The semiconductor structure is similar to the structure of Fig. 1, and has a substrate 20 with an area of impurities 22 diffused therin to form a junction 24. An insulating layer 26 is deposited over the substrate leaving an exposed area over the diffused area 22. The doped area 22 need not be diffused into the substrate 20 as shown, but may be diffused into an epitaxial layer deposited on the substrate, or into another diffusion to form a multiplicity of junctions, and still fall within the scope of the invention.

The improvement, according to the invention, is obtained through the use of an aluminum alloy metallization layer 28 to make the ohmic contact to the device. The metallization layer 28 includes aluminum with the addition of a relatively small percentage of another metal such as, for example, iron, magnesium, chromium, manganese, nickel, cobalt and titanium. Other metals may also be added to the aluminum to achieve other desirable physical qualities without reducing the effectiveness of the alloy according to the invention. In one embodiment, a small amount of iron in the amount of 0.1 percent to 1 percent by weight, with a preferred amount of 0.4 percent, is added to the aluminum to form the metallization layer 28.

The layer 28 of the aluminum alloy metallization is deposited over the entire substrate using vapor deposition techniques similar to those used in the deposition of pure aluminum. The aluminum and the alloying metal are co-deposited during the deposition steps by evaporating an aluminum alloy or by simultaneously co-evaporating pure aluminum and the desired alloying metal in the evacuated evaporation chamber. The evaporation of an alloy is preferred because aluminum alloys having various percentages of iron, magnesium, chromium, manganese, nickel, cobalt and titanium are readily available, and the use of an alloy simplifies the evaporation step. The aluminum alloy is heated to a temperature on the order of 1,000° to 1,200° and is evaporated and deposited on the substrate. Subsequent to deposition, the aluminum alloy is masked and etched to a predetermined pattern and alloyed into the contact to form an ohmic contact as in the case of the pure aluminum contact.

The addition of iron or one of the aforementioned metals significantly reduces the solubility of silicon into the contact metal, as well as reducing the etching time in the above mentioned process. Metals from the aforementioned group have been used, in the prior art, to make the contact metal more soluble in etching solution to reduce the etching time of the metallization pattern. However, no one has taught the use of the aforementioned metals to reduce the solubility of silicon into the contact metal, according to the instant invention. Recognition of the fact that the aforementioned metals reduce the solubility of silicon into the contact metal makes it possible to make semiconductor devices having shallower diffusions than were heretofore considered possible without the addition of silicon to the contact metal. Even though aluminum alloy layers were previously used on semiconductor devices for other purposes, the structures were built with relatively deep diffusions. Whenever shallow diffusion devices were built, aluminum-silicon metallization layers were employed.

During the alloying process, wherein the device is heated to approximately 500°C, some of the silicon from the semiconductor device is dissolved into the alloy contact. The dissolved silicon is removed from an alloying area denoted by a dotted line 29. Due to the reduced solubility of silicon in the alloy according to the invention, the contact becomes saturated with silicon during the alloying time, and the depth of the alloying region is not significantly effected by the length of the alloying time, nor by subsequent heating of the device. The solubility of the silicon in the aluminum contact is such that the alloying region 29 extends below the surface of the silicon a sufficient amount to provide an ohmic contact, but is shallow enough to prevent interference with junction 24.

The use of an aluminum alloy metallization layer, according to the invention, has the further advantages of reducing the problem of electromigration at ohmic contacts, and of reducing the time required to etch a conductor pattern on the metallization layer. In addition, no silicon residue remains following the etching step. The above mentioned advantages allow the production of more reliable semiconductor devices than could heretofore be manufactured through the provision of higher quality ohmic contacts than could previously be achieved.

We claim:

1. A method of making an ohmic contact to a semiconductor device comprising the steps of:

forming a protective insulating material pattern on the surface of said device with contact areas of silicon left exposed;

evaporating a layer of contact metal comprising aluminum with a relatively small percentage of at least another metal selected from the group consisting of iron, magnesium, chromium, manganese and cobalt on said pattern and onto said contact area; and heating said device to form an ohmic contact between said contact metal and said contact areas of silicon;

whereby the nature of the material of the device at said contact areas remains substantially unaffected during the heating forming the ohmic contact and during subsequent heating.

2. A method as recited in claim 1, wherein said layer of contact metal is evaporated onto said device by the further steps of:

placing an alloy comprising aluminum and a 0.1 to 1 percent portion of a metal from said group into a vacuum chamber with said device, and heating said alloy to a sufficiently high temperature to vaporize said alloy.

3. A method of making an ohmic contact to a semiconductor device comprising the steps of:

forming a protective insulating layer on a surface of said device;

forming an opening in a predetermined area of said insulating layer to expose a portion of the surface of the semiconductor material of said device as a contact area;

depositing a layer of contact metal comprising aluminum with a small percentage addition of at least one other metal selected from the group consisting of iron, magnesium, chromium, manganese, and cobalt over said insulating layer and onto said contact area;

removing said metal layer except for metal on said contact area and conductor lines and terminals therefrom; and heating said semiconductor device to alloy a predetermined amount of semiconductor material from said surface into said metal over said contact area.

4. A method as recited in claim 3, wherein said layer of contact metal is deposited by evaporating an alloy comprising aluminum and a 0.1 to 1 percent portion of a metal from said group onto said device.

5. A method as recited in claim 3, wherein said layer of contact metal is deposited by simultaneously evaporating aluminum and a metal from said group.

* * * * *